United States Patent
Jeong (10) Patent No.: US 8,812,369 B2
(45) Date of Patent: Aug. 19, 2014

(54) METHOD AND APPARATUS FOR REQUESTING SERVICE USING MULTI-DIMENSIONAL CODE

(76) Inventor: Yong-Seok Jeong, Seoul (KR)

( * ) Notice: Subject to any disclaimer, the term of this patent is extended or adjusted under 35 U.S.C. 154(b) by 1581 days.

(21) Appl. No.: 11/718,186

(22) PCT Filed: Nov. 2, 2005

(86) PCT No.: PCT/KR2005/003669
§ 371 (c)(1),
(2), (4) Date: Apr. 27, 2007

(87) PCT Pub. No.: WO2006/049425
PCT Pub. Date: May 11, 2006

(65) Prior Publication Data
US 2009/0254954 A1  Oct. 8, 2009

(30) Foreign Application Priority Data

Nov. 2, 2004 (KR) .................. 10-2004-0088227
Nov. 20, 2004 (KR) .................. 10-2004-0095492
Jun. 24, 2005 (KR) .................. 10-2005-0054787

(51) Int. Cl.
*G06Q 30/00* (2012.01)
*G06Q 30/06* (2012.01)

(52) U.S. Cl.
CPC ................. *G06Q 30/0601* (2013.01)
USPC ...................................... 705/26.1

(58) Field of Classification Search
CPC ............................... G06Q 30/0601
USPC ............ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 6,470,096 B2 * | 10/2002 | Davies et al. | .................. | 382/203 |
| 6,678,425 B1 * | 1/2004 | Flores et al. | .................. | 382/289 |
| 6,985,875 B1 * | 1/2006 | Wolf | ............................... | 705/26 |
| 7,487,112 B2 * | 2/2009 | Barnes, Jr. | ...................... | 705/26 |

FOREIGN PATENT DOCUMENTS

| | | | |
|---|---|---|---|
| KR | 10-2003-0089035 A | | 11/2003 |
| WO | 98-24036 A1 | | 6/1998 |
| WO | 00-72232 A1 | | 11/2000 |

OTHER PUBLICATIONS

No Author, "Choosing the best 2D barcode format for mobile apps" Semacode Technical white paper, Copyright © 2006 Semacode, Jul. 16, 2006.*
No Author, "Retail Bar Coding Basics a Tutorial" Bars & Stripes, Nov. 2005.*

* cited by examiner

*Primary Examiner* — Naeem Haq
(74) *Attorney, Agent, or Firm* — AKC Patents LLC; Aliki K. Collins (57) ABSTRACT

The present invention is directed to a method for requesting a service, using a multi-dimensional code. According to a preferred embodiment of this invention, a user terminal recognizes a multi-dimensional code displayed with information or advertisement in any of information delivery media (e.g., television, newspaper, magazine, etc.), and receives and displays detailed information corresponding to the information or advertisement or performs ordering/making a payment for a product corresponding to the advertisement. With the present invention, not only does it become more convenient to order/make a payment for an advertised product, but also a variety of services corresponding to the pertinent product can be provided.

27 Claims, 5 Drawing Sheets

FIG. 2

| 201 | 203 | 205 |
|---|---|---|
| 0000 | 0 | white |
| 0001 | 1 | beige |
| 0010 | 2 | yellow |
| 0011 | 3 | coral |
| 0100 | 4 | magenta |
| 0101 | 5 | deep pink |
| 0110 | 6 | red |
| 0111 | 7 | silver |
| 1000 | 8 | burlywood |
| 1001 | 9 | cyan |
| 1010 | 10 | spring green |
| 1011 | 11 | green |
| 1100 | 12 | dark cyan |
| 1101 | 13 | blue |
| 1110 | 14 | midnight blue |
| 1111 | 15 | black |

METHOD AND APPARATUS FOR REQUESTING SERVICE USING MULTI-DIMENSIONAL CODE

REFERENCE TO RELATED APPLICATIONS

This is a continuation of pending International Patent Application PCT/KR2005/003669 filed on Nov. 2, 2005, which designates the United States and claims priority of Korean Patent Application No. 10-2004-0088227 filed on Nov. 2, 2004; No. 10-2004-0095492 filed on Nov. 20, 2004; No. 10-2005-0054787 filed on Jun. 24, 2005.

FIELD OF THE INVENTION

The present invention relates to a method and apparatus for requesting service, more specifically to a method and apparatus for requesting service using multi-dimensional codes.

BACKGROUND OF THE INVENTION

Today, a large number of products are sold through TV home shopping channels, product catalogues and Internet shopping malls. Consumers purchase the advertised products by calling the phone number indicated in the advertising medium or by accessing the shopping site and following a series of ordering steps. In this process, consumers provide or input the 6- or 7-digit product code corresponding to a product to a telemarketer or an automatic response system to indicate the product they want to purchase.

This conventional way of ordering and making a payment requires a lot of time and resources because it involves a number of steps, including dialing the number, communicating with a telemarketer through a phone, confirming the order and making a payment.

Since products advertised through the media (i.e., visual media, print media, etc.) are not linked to the detailed information on these products, consumers have to make an extra effort to access to this information through a separate communication terminal. Moreover, consumers have to manually input the access address for accessing to the information. Recently, however, use of barcodes or two-dimensional barcodes is attempted, although not widespread yet, to ease the labor of having to input the access address. Much information is being provided through visual media or print media. But this information is provided through one-way communication, and any user who desires more detailed information has to search for more information in other information media.

SUMMARY OF THE INVENTION

In order to solve aforementioned problems, the present invention aims to provide a method and apparatus for requesting service using a multi-dimensional code for an easy access to the corresponding detailed information, by displaying a multi-dimensional code together with the corresponding information in information media (e.g., TV, newspaper, magazine, business card, bill, etc.). Another objective of this invention is to provide a method and apparatus for requesting service using a multi-dimensional code to allow a convenient ordering of a product through the use of a communication terminal, by displaying a product to sell and a multi-dimensional code for ordering the product on advertising media. Another objective of the present invention is to provide a method and apparatus for requesting service using a multi-dimensional code to allow a user to access to detailed information without any manual input, by linking detailed information on a product to a screen advertising the product.

Another objective of the present invention is to provide a method and apparatus for requesting service using a multi-dimensional code to allow a user make a payment for the ordered product through a communication terminal.

Another objective of this invention is to provide a method and apparatus for requesting service using a multi-dimensional code that discourages impulse buying and encourages a careful buying decision by allowing non-realtime ordering of a product using an access information file corresponding to the image data and/or conversion information of an advertising screen stored in a communication terminal. If a user saves an advertising screen of a product in a communication terminal, although the advertisement was provided realtime, for example on a TV home shopping channel, the user can order the product using the image data, the conversion information converted from the image data or a stored access information file corresponding to one of these data. The present invention also aims to provide a method and apparatus for requesting service using a multi-dimensional code to allow payment for a product or service (e.g., gas, food, etc.) even at an off-line store (e.g., gas station, restaurant, etc.) using a user's communication terminal capable of making a payment through a reserved word or recognizing a multi-dimensional code presented by the store.

The present invention also aims to provide a method and apparatus for requesting service using a multi-dimensional code that allows a first user, who generated an advertising screen as the image data, to transmit the image data, the conversion information converted from the image data or a stored access information file corresponding to one of these data to a second user through a communication network such that the second user can purchase a product corresponding to the image data. Here, transmitting the conversion information or access information file can improve the transmission efficiency than transmitting the image data.

Another objective of the present invention is to provide a method and apparatus for requesting service using a multi-dimensional code to allow accurate ordering of a product by automatically correcting an error occurred between the time the data is received and the time the data is displayed in the satellite broadcasting or in the same broadcasting medium.

To achieve aforementioned objectives, an aspect of the present invention provides a method for requesting a service corresponding to at least one of the displays of information and advertisement displayed in information delivery media, using a user terminal, and/or a recorded medium recording a program for performing the method. A preferred embodiment of the present invention provides a method for requesting a service corresponding to at least one of the displays of information and advertisement displayed in information delivery media, using a user terminal, the method comprising: (a) generating image data by photographing a multi-dimensional code displayed to correspond to the display; (b) converting the image data to conversion information based on a predetermined rule; (c) generating request information corresponding to one of the order request and detailed information request, using obtained information, which is at least one of the image data and the conversion information, and time information corresponding to the image data; (d) transmitting the generated request information to an information device through a communication network; and (e) displaying information corresponding to data or access URL received from the information device.

The step (b) can comprise extracting a multi-dimensional code image, using at least one of outline extraction technique, skip scan technique, multi scan technique, and area priority information in the image data; and converting the extracted multi-dimensional code image to the conversion information, using the rule. The step (c) can be preceded by storing the obtained information and the time information; and receiving commands for selecting the obtained information and generating and transmitting the request information.

The obtained information and the time information can be stored as an electronic file in a predetermined file format in the step of storing the obtained information and the time information. Here, the electronic file can be generated to additionally include one or more supplementary information corresponding to a predetermined or user-selected data storage structure, and the supplementary information can be one or more of location information, personal information, payment information, identification information of the user terminal, hobby information, gender information, e-mail address, and designated service number information.

The time information can be compensated by a predetermined error value from the time at which the image data is generated.

The step (c) of the method for requesting a service can comprise generating location information of the user terminal; and generating the request information, using the location information, the obtained information, and the time information.

The above method for requesting a service can further comprise receiving a payment information request corresponding to the order request from the information device; and transmitting payment information corresponding to the payment information request to the information device through a communication network. The multi-dimensional code can be displayed as lattices of m (natural number)×n (natural number), to each of which an attribute is applied, and the conversion information can be interpreted from the attribute of each lattice according to a predetermined rule. The multi-dimensional code can have a concentric circular structure, in which a plurality of circles with different radii are formed in bands; each circle can be partitioned to n (natural number) regions, to each of which an attribute is applied; and the conversion information can be interpreted from the attribute of each region according to a predetermined rule in the clockwise or counterclockwise direction from the center to the outside.

The attribute can be one or more of color, design, pattern, and letter. The information device can be one or more of visual media and print media. The multi-dimensional code can comprise information corresponding to one or more of media identifier, channel identifier, serial number information, location information, language identifier information, and level identifier information.

The method for requesting a service can further comprise prestoring connection information corresponding to each of one or more conversion information, determining whether conversion information of the step (b) is identical to the stored conversion information, and performing the step (c) if conversion information of the step (b) is not identical to the stored conversion information. Moreover, the method can further comprise extracting connection information corresponding to the conversion information if the conversion information of the step (b) is identical to the stored conversion information; and using the extracted connection information to attempt to make an access through a communication network. Another preferred embodiment of the present invention provides a recorded medium, structured with a program of commands executable by a digital processing device to perform a method for requesting a service corresponding to a display in information delivery media, and readable by the digital processing device, the recorded medium comprising the acts of generating image data by photographing a multi-dimensional code displayed to correspond to the display corresponding to one or more of information and advertisement displayed in information delivery media; converting the image data to conversion information based on a predetermined rule; generating request information corresponding to one of the order request and detailed information request, using obtained information, which is at least one of the image data and the conversion information, and time information corresponding to the image data; transmitting the generated request information to an information device through a communication network; and displaying information corresponding to data or access URL received from the information device.

To achieve the above objectives, another aspect of the present invention provides a user terminal for requesting a service corresponding to at least one of the displays of information and advertisement displayed in information delivery media.

A preferred embodiment of the present invention provides a user terminal for requesting a service corresponding to at least one of the displays of information and advertisement displayed in information delivery media, the user terminal comprising a camera unit generating image data by photographing a multi-dimensional code displayed to correspond to the display, a conversion unit converting the image data to conversion information based on a predetermined rule, a request information generating unit generating request information, using obtained information, which is at least one of the image data and the conversion information, and time information corresponding to the image data, and a communication unit transmitting the generated request information to an information device through a communication network and receiving data or access URL corresponding to the request information from the information device, wherein the request information is one or more of an order request and detailed information request The conversion unit can extract a multi-dimensional code image, using at least one of outline extraction technique, skip scan technique, multi scan technique, and area priority information in the image data, and convert the extracted multi-dimensional code image to the conversion information, using the rule.

The multi-dimensional code can be displayed as lattices of m (natural number)×n (natural number), to each of which an attribute is applied, and the conversion information can be interpreted from the attribute of each lattice according to a predetermined rule.

The multi-dimensional code can have a concentric circular structure, in which a plurality of circles with different radii are formed in bands; each circle can be partitioned to n (natural number) regions, to each of which an attribute is applied; and the conversion information can be interpreted from the attribute of each region according to a predetermined rule in the clockwise or counterclockwise direction from the center to the outside.

The attribute can be one or more of color, design, pattern, and letter. The user terminal can further comprise a storage unit storing the obtained information and the time information; and an input unit for receiving commands for selecting the obtained information and generating and transmitting the request information. The storage unit can store an electronic file, in a predetermined file format, generated to correspond to the obtained information and the time information. Here, the electronic file can be generated to additionally include one or more supplementary information corresponding to a predetermined or user-selected data storage structure, and the supplementary information can be one or more of location information, personal information, payment information, identification information of the user terminal, hobby information, gender information, e-mail address, and designated service number information. Once a selection command and recipient information of the obtained information are inputted through the key input unit, the communication unit can transmit the obtained information and the time information to correspond to the recipient information. The advertising medium can be one or more of visual media and print media.

The user terminal can further comprise an error compensation unit generating the time information compensated by a predetermined error value from the time at which the image data is generated.

The user terminal can further comprise a location information generating unit generating location information of the user terminal, wherein the request information generating unit can generate the request information by further comprising the location information.

The user terminal can further comprise a storage unit storing payment information comprising one or more of credit card information, phone number, and authentication information; and an extraction unit extracting the payment information. Here, in case the communication unit receives a payment information request corresponding to the order request from the information device, the communication unit can transmit the payment information extracted by the extraction unit to the information device. The multi-dimensional code can comprise information corresponding to one or more of media identifier, channel identifier, serial number information, location information, language identifier information, and level identifier information.

The user terminal can further comprise a storage unit storing connection information corresponding one or more conversion information; and a connection information extraction unit extracting connection information corresponding to conversion information converted by the conversion unit from the storage unit.

BRIEF DESCRIPTION OF THE DRAWINGS

These and other features, aspects, and advantages of the present invention will become better understood with regard to the following description, appended claims, and accompanying drawings where:

110: Advertising media
120: Order and payment terminal
125: Camera unit
130: Conversion unit
135: Storage unit
140: Request information generating unit
145: Key input unit
150: Display unit
155: Communication unit
160: Control unit
170: Product management device

DETAILED DESCRIPTION OF THE INVENTION

The present invention, operative advantages of the present invention, and objectives achieved by embodying the present invention shall be apparent with regard to the accompanying drawings and the description therein.

Hereinafter, preferred embodiments of the present invention shall be described in detail with reference to the accompanying drawings. A user terminal based on the present invention can recognize a multi-dimensional code displayed in an information medium or receive a supplementary code corresponding to the multi-dimensional code to convert to the data (e.g., characters, numbers, or combinations thereof) and send to an information device, displaying the detailed information (e.g., in-depth information, related information, details, etc.). Here, the information medium is a medium, including television, book, newspaper, magazine, business card, notification, announcement, and billboard, for delivering information. If the delivered information is, for example, an advertisement, order and/or payment can be made through the use of a multi-dimensional code displayed to correspond to the advertised information, and detailed information on the product can be obtained. The multi-dimensional code for order and/or payment and the multi-dimensional code for detailed information can be provided separately or together, such that the user can choose the information needed. The supplementary code, which is displayed to correspond to the multi-dimensional code, can be identical to the conversion information. The supplementary code can be displayed, for example, in the lower part of the multi-dimensional code.

Hereinafter, the description will be focused on a case when the information medium is an advertisement, and the supplementary code is identical to the conversion information. Through the below description that ordering, making a payment, and provision of detailed information are capacitated using a multi-dimensional code displayed with the advertisement in the advertisement media, anyone skilled in the art shall easily understand that detailed information can also be provided using a multi-dimensional code displayed on other information media.

The advertising media to which the present invention can be applied include TV commercials, home shopping programs, newspapers, magazines, radio programs, and monitors displaying Internet shopping sites. It is also apparent that entertainment contents, such as dramas and movies, can function as advertising media if they display multi-dimensional codes to enable the ordering, making a payment, and requesting detailed information on props or locations appeared in the content or on a product name appeared with particular information, for example, a review article on a particular product.

Figure 1:
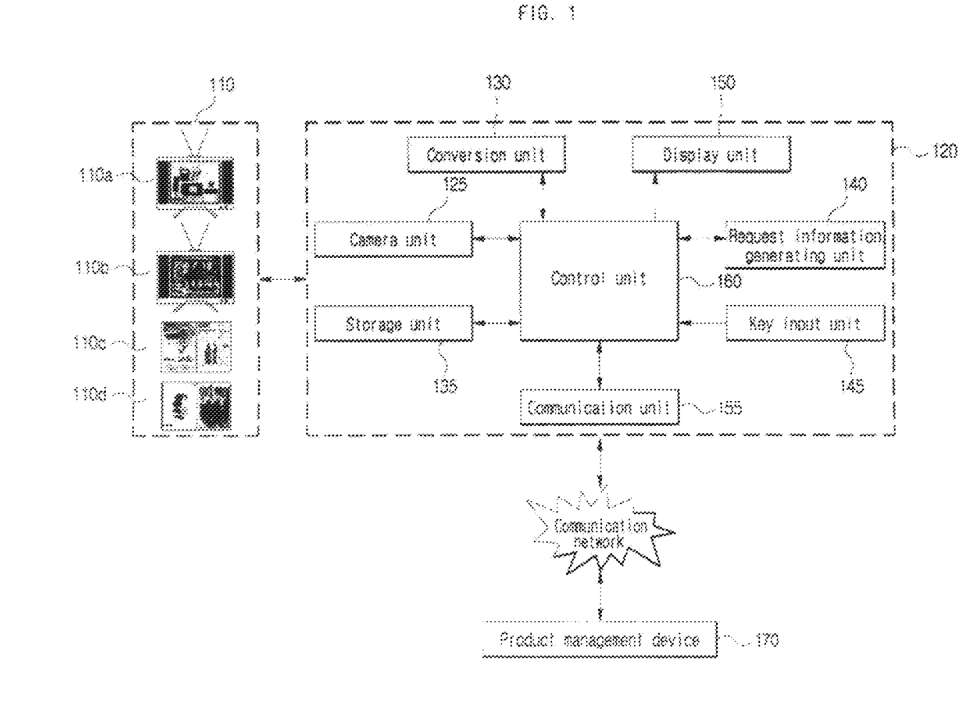
FIG. 1 shows an overview of a system for performing an order payment method using a multi-dimensional code based on a preferred embodiment of the present invention.
Figure 2:
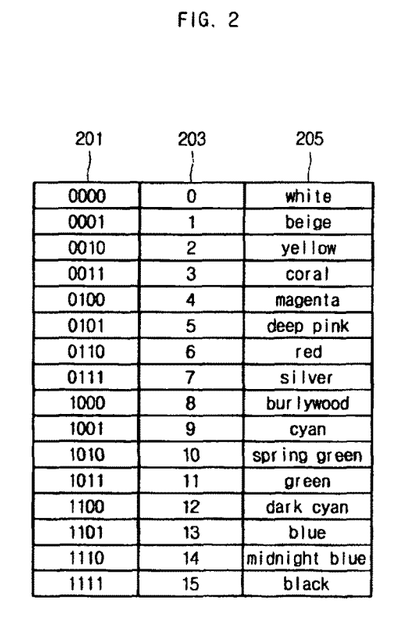
FIG. 2 shows an example of a color chart using a 4-dimensional code based on a preferred embodiment of the present invention.
Figure 3:
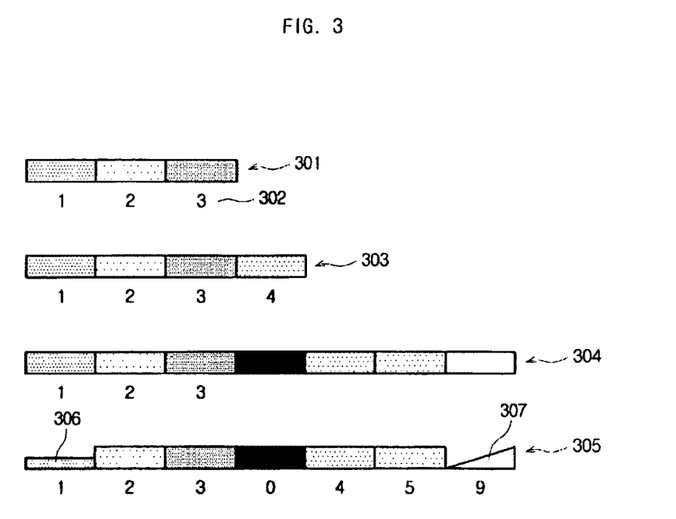
FIGS. 3 and 4 show forms of multi-dimensional codes based on a preferred embodiment of the present invention.
Figure 4:
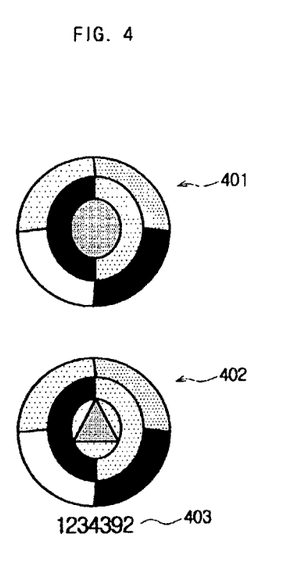

The user terminal can be realized as a communication terminal capable of performing the above-mentioned functions, for example, a PDA, cellular phone, remote control of an electronic device. FIG. 1 is an overview of a system for performing an order payment method using a multi-dimensional code based on a preferred embodiment of this invention, and FIG. 2 is an example of a color chart using a 4-dimensional code based on a preferred embodiment of this invention, while FIGS. 3 and 4 are forms of multi-dimensional codes based on a preferred embodiment of this invention. Referring to FIG. 1, an order and payment terminal 120 (i.e., user terminal) recognizes a multi-dimensional code displayed on the advertising media 110 and sends to a product management device 170 (information device) to order a product or make a payment or receives detailed information corresponding to the product to display on a display unit 150. Of course, an information device can be divided into a primary device handling the order and payment and a secondary device handling the detailed information. Moreover, the primary and secondary devices can be independent devices connected through a communication network.

Advertising media 110 include television 110a, 110b, newspaper 110c, magazine 110d, and radio, which allow audio and visual recognition. Television commercials usually include spot commercials 110a, which are inserted for a short period between programs, and home shopping programs 110b, which are broadcast for a longer, specified period on home shopping channels to promote the sale of products. Additionally, if locations or clothing worn by characters, appeared in a TV program (e.g., soap opera) or a movie played back through a medium such as DVD, can be made to display multi-dimensional codes to allow ordering and making a payment, it can also function as advertising media. A newspaper 110c and magazine 110d can carry one or more advertisements on a page or a certain section of a page. It is apparent, of course, that certain words (e.g., MP3 Player by Iriver) in an information section, not an advertisement section, of a newspaper 110c or a magazine 110d can be advertising media if these words are displayed with multi-dimensional codes printed to enable ordering and making a payment. Moreover, a monitor displaying a certain web page of an Internet shopping mall can clearly be an advertising medium.

Some section of an advertisement outputted through the advertising media 110 for application of this invention also displays a multi-dimensional code (and supplementary code). A case of using 4-dimensional codes is illustrated in FIG. 2 as an example of multi-dimensional codes.

Referring to FIG. 2, each 4-dimensional code 201 can be preset to correspond to one of code values 203 between 0 and 15 and a color value 205. When basing on the 4-dimensional code, one of the 16 data can be displayed on a lattice for displaying a multi-dimensional code, enabling the expression of a hexadecimal number in one lattice. For example, the code value corresponding to the 4-dimensional code of 0000 is 0 (i.e., $0\times2^3+0\times2^2+0\times2^1+0\times2^0=0$), and the color value corresponding to this code value can be preset as white. The code value corresponding to the 4-dimensional code of 1111 is 15 (i.e., $1\times2^3+1\times2^2+1\times2^1+1\times2^0=15$), and the corresponding color value can be preset as black. Of course, the level information 201, code value 203, and color value 205 can be set differently. Moreover, pattern values can be applied in place of the color values.

As the 4-dimensional codes 201 are made to be included as a color value in a lattice, and 12 lattices are made to be structured, a total of $2^{<4\times12>}(=2^{48})$ varieties can be expressed. Likewise, the lattices are structured to display between 1 letter and 8 letters, and each lattice is made to display 1 alphabet letter instead of the color value 205, a total of $1\times26^1+1\times26^2+1\times26^3+\ldots+1\times26^7+1\times26^8$ varieties can be expressed.

As described above, by increasing the expression level of the multi-dimensional code or the number of expressions, the number of potential expressions can be exponentially increased.

FIGS. 3 and 4 show forms of multi-dimensional codes.

As shown in FIG. 3, a multi-dimensional code can be structured in the form of a rectangle, in which lattices in the quantity of "n" are connected, as in 301 and 303. Increasing the number of lattices or colors and/or patterns to be expressed can increase the quantity of information that can be expressed through the multi-dimensional codes. In the lower part of the multi-dimensional codes, conversion information corresponding to each lattice is displayed as supplementary codes, as shown in 302 and 303. A user who does not have a terminal that can recognize multi-dimensional codes can input the supplementary codes in the lower part through a key input unit 145 to order, make a payment, and/or request detailed information. Therefore, the supplementary codes may not be displayed.

301 is a simplest form of a multi-dimensional code, identifying a channel identifier in a 3-digit number for visual media such as airwave TV broadcasting, satellite TV broadcasting, cable TV broadcasting, and Internet TV. In this case, one of the three lattices can be for designating the type of visual media, and the other two lattices can be for channel identifiers.

303 is a multi-dimensional code additionally having a serial number such that selecting product packages or options is possible, as in Internet home shopping, for the case of having different product codes or a plurality of products requiring distinction during the same time period. That is, the last lattice can be a serial number.

The number of lattices can be increased, as in 304, to display a serial number, in which case the serial number can be omitted if a supplementary code is displayed. If a user wants to use a multi-dimensional code such as 301 to order a product or request detailed information while the multi-dimensional code does not contain a serial number, as in 303 or 304, although there are a plurality of products sold at the same time period, a product management device 170 can have the selection menu screen display on a display unit 150 of the order and payment terminal 120. The user can order a product or request detailed information by selecting the product on the selection menu screen displayed on the display unit 150. In this case, the user can send the quantity of order, cellular phone number, and authentication information (e.g., password), when placing an order, to order and make a payment simultaneously.

305 is a multi-dimensional code made for easy reading by displaying with a starting positing 306 and ending position 307. For example, by indicating the starting position 306 of a multi-dimensional code with a different lattice height or by setting the ending position 307 of a multi-dimensional code with a right triangle (i.e., functioning as a period), recognition of a multi-dimensional code can be made easy in an order and payment terminal 120. The starting position 306 and ending position 307 can, of course, be displayed by differentiating the color or pattern. Likewise, the supplementary code corresponding to the lattice indicating the starting position 306 and ending position 307 of a multi-dimensional code can be preset as 0 and 9, respectively. By displaying the starting position 306 and/or ending position 307, correct recognition of multi-dimensional codes is possible even if a captured image is tilted clockwise or counterclockwise or flipped upside down as in a phone that rotates the screen. FIG. 4 is an illustration of multi-dimensional codes in circular forms. As shown in FIG. 4, a multi-dimensional code can be expressed in the form of a concentric circle, in which case the lattice can be halved as the lattice is positioned away from the center. For example, the further a circle is positioned away from the center, the same areas can be divided either vertically or proportionally. The lattice can be proportionally divided by a multiple of 2 (e.g., 2, 4, 8, 16, . . . ) or by a multiple of a specific number (e.g., 1, 2, 3, 4, . . . ; 2, 3, 4, 5, . . . ; or 2, 4, 6, 8, . . . , etc.). In order for an order and payment terminal 120 to recognize the base position of a multi-dimensional code easily, the center can be displayed as a triangle, from the vertex of which the lattice is read clockwise or counterclockwise. In case the center is expressed in the form of a rectangle, the circle can be also expressed as an odd-number matrix (e.g., 8, 16, 24, 32, 40, . . . ) or even-number matrix structure that expands as the circle is positioned away from the center. Of course, it is apparent that the multi-dimensional code can be formed in various forms (e.g., triangle) other than a concentric circle.

401 in FIG. 4 is an illustration of a multi-dimensional code expressed in a form of 3 concentric circles, displaying 7 hexadecimal numbers. In 402, the center of the concentric circle is expressed by a triangle for an easy recognition of the starting point, and conversion information of "1234392," which is the code value, is indicated in the lower part of the concentric circle.

A multi-dimensional code based on the present invention can secure the compatibility between media. Thus, the lattice for indicating the separate setting information can be omitted as described above in case the setting information (e.g., level information, language, advertising medium, etc.) is used as a standard setting.

However, if multi-dimensional codes of the same type have different level information, one lattice, which is the smallest unit capable of indicating the color, pattern, or shape, can be included as a level identifier lattice in a multi-dimensional code. Likewise, if multi-dimensional codes of the same type have different languages, (e.g., Korean, English, etc.) one lattice can be included in a multi-dimensional code as a language identifier lattice. For instance, Korean, English, and Japanese can be assigned with 0, 1, and 2, respectively, and be indicated by different colors, patterns, or shapes. Of course, the language identifier lattice may not be included in a multi-dimensional code, and the user can set the service language using the key input unit after the multi-dimensional code is recognized. Whether the user selected a language can be identified by the number of digits of the conversion information or a predetermined classifier (e.g., * or #). Through this, each user can be serviced through the language of choice when requesting detailed information on the same product. Moreover, if multi-dimensional codes of the same type have different advertising media, one lattice can be included in a multi-dimensional code as an advertisement identifier lattice. For example, a multi-dimensional code can be structured with one or more media identifier lattice, channel identifier lattice, manufacturer identifier lattice, and serial number display lattice. In case a multi-dimensional code with the media identifier lattice is used, the product management device 170 and/or the sponsor can additionally obtain information on consumer behavior on advertising media and statistics. The media identifier may be omitted and not displayed in order to minimize the length of the multi-dimensional code. In this case, the user can set a media identifier corresponding to the favorite advertising medium as default in the order and payment terminal 120, similar to, for example, assigning an area code of choice to be entered automatically for every local call.

A multi-dimensional code can additionally comprise location display lattice, since different commercials can be provided to different regions despite the same broadcast channel. If the location display lattice is not included, the order and payment terminal 120 can include location information identified through a GPS satellite signal and base station signal and send to the product management device 170 to have the product management device 170 identify the location of the order and payment terminal 120. The purchaser also can pre-register his location by use of the location setting function of the order and payment terminal 120, although the location identifier is omitted, to use when ordering or requesting detailed information. This is because different broadcast media can have different coverage. For example, while satellite broadcasting can cover the entire nation, airwave broadcasting can reach the range of the airwave, and cable broadcasting can cover certain neighborhoods or boroughs. In effect, the US, Europe, China, and other nations with large areas can have different broadcasting business per region for the same broadcasting channel. The use of location display lattice for ordering or requesting information will be described later.

In general, video media or print media, such as a videotape, must be displayed in a multi-dimensional code that can be inputted through a camera unit 125, and can be displayed with a supplementary code. Thus there is no restriction on what type of multi-dimensional code is used as long as it can be visually recognized. For a print medium displayed in color, for example, a multi-dimensional code with lattices displayed in color values is preferable, while a multi-dimensional code displayed in pattern or shape is preferable for a black and white medium.

The above multi-dimensional code can be used separately for ordering and/or making a payment and requesting information, and a plurality of multi-dimensional codes can be displayed for a single product. Furthermore, a use identifier lattice can be included in a multi-dimensional code to display the use of the multi-dimensional code.

The above multi-dimensional code can further comprise a service identifier lattice. A service identifier lattice is for specifying a service (e.g., e-mail counseling, phone counseling, etc.) provided to a user. Like the above language identifier lattice, the service identifier lattice may not be included in a multi-dimensional code, and a user can designate a specific service through the key input after the multi-dimensional code is recognized. Designation of a specific service can be identified through the number of digits of the conversion information or through a predetermined classifier (e.g., * or W). Referring to FIG. 1 again, an order and payment terminal 120 comprises a camera unit 125, conversion unit 130, storage unit 135, request information generating unit 140, key input unit 145, display unit 150, communication unit 155, and control unit 160.

A camera unit 125 photographs a multi-dimensional code displayed in advertising media 110 and generates an image data. The camera unit 125 can comprise lenses and a camera module.

A conversion unit 130 converts an image data to a conversion information (e.g., letters, numbers, or combinations thereof) using the multi-dimensional code conversion rules stored in the storage unit 135. The conversion unit 130 can skip the conversion of an image data if conversion information corresponding to the image data is already stored in the storage unit 135. The conversion unit 130, of course, can selectively convert the image data selected by the user. The conversion unit 130 can have a reconversion protection tag inserted into an image data converted to conversion information. Through the reconversion protection tag, the conversion unit 130 can skip the conversion of an image data whose conversion information is already generated.

If a supplementary code is inputted through the key input unit 145, the conversion unit 130 can convert the supplementary code to the corresponding conversion information (the supplementary information and conversion information can be identical) or the image data corresponding to a multi-dimensional code. The conversion unit 130 can also convert the image data, conversion information and/or supplementary code data to a corresponding access information file. An access information file can be a file format (e.g., *.tml (text meta link), *.iml (image meta link), etc.) combining the conversion information and time information. The conversion unit 130 can generate an access information file to have the payment information included when the access information file is generated. The access information file can have a variety of data storage structures as illustrated in Table 1 below:

TABLE 1

| Data Storage Structure No. | Record of Field in the number of N |
| --- | --- |
| 001 | Conversion Data, Time information, Location information |
| 002 | Conversion Data, Time information, Personal information (e.g., preference code) |
| 003 | Conversion Data, Time information, Personal information (e.g., preference code) |
| 004 | Conversion Data, Time information, Personal information (e.g., membership code) |
| 005 | Conversion Data, Time information, Terminal ID Data |
| 006 | Conversion Data, Time information, Terminal ID Data, E-mail Address |
| 007 | Conversion Data, Time information, Terminal ID Data, Payment information |
| 008 | Conversion Data, Time information, Gender |
| 009 | Conversion Data, Time information, Payment information, Option Data (Period Restriction, Quantity Restriction, etc.) |
| ... | ... |
| 999 | Conversion Data, Time information, Terminal ID Data, Hobby, E-mail Address, Payment information |

As described above, ordering or requesting information by use of identical data (e.g., image data, conversion information, and inputted supplementary code) or identical time information can provide different information or products per user, by diversifying the data storage structure. For example, the data storage structure of 008 can provide products or information differentiated by gender for products advertised on the same channel during the same time period.

The above data storage structure can be set as default or selected by the user when each access information file is generated. For example, if the user wants to place an order later using the access information file generated at present but wants to order and make a payment without providing separate payment information, the user can select the structure of 007 to avoid providing separate payment information when placing an order later.

The supplementary information (e.g., terminal ID data, payment information, etc.) in addition to the required data (i.e., conversion data and time information) can be separately selected on the option selection screen displayed on the display unit 140. The numbers or options for data storage structure can be selected through, for example, a separate function displayed on the user screen.

Each access information file generated by the various data storage structures described above can be automatically saved in an independent directory or a user-designated directory. Like the conventional speed dial function, which enables a quick selection of stored phone numbers, the access information file stored in the storage unit 135 can be quickly selected through a speed code.

The name for an access information file generated by the above method can be automatically created a predetermined method. For example, the file name can be a combination of media identifier and generated time. Besides, the file name can comprise, for example, the name of broadcaster and/or program to make the user's search easy. If the broadcaster's name or the title of the program is already stored in the storage unit 135 of an order and payment terminal 120, the conversion unit 130 can extract the information generate the name of the access information file automatically, in which case the file stored in the storage unit 135 can be a temporary storage file or permanent storage file. If the broadcaster's name and program title corresponding to the conversion information have not been stored, the conversion information and time information can be sent to the product management device 170 through a communication network and receive the information to generate the name of the access information file automatically. Of course, the name of the access information file can be temporarily generated and stored, and can be updated after receiving the relevant information from the product management device 170.

The conversion unit 130 can further perform a function of extracting a multi-dimensional code from the data of a photographed image. For example, if a user photographed a TV screen displaying a multi-dimensional code, through the use of an order and payment terminal 120, the photographed image includes not only a multi-dimensional code but also the program information (e.g., commercial, drama, etc.) outputted through the television screen. The conversion unit 130 can extract the multi-dimensional code, using the outline extraction technique, skip scan technique, or multi scan technique, from the photographed image data, and convert the extracted multi-dimensional code to the conversion information using the above method. The techniques for extracting a multi-dimensional code from the image data are apparent for those skilled in the art, and thus will be omitted from the description. Extracting a multi-dimensional code, which is present in a certain region of the entire image data, can be time-consuming. To minimize the time taken in the extracting process, the conversion unit 130 can be set to prioritize the region. That is, if the multi-dimensional codes are set to be present on the upper left corner the most, for example, followed by the lower right corner, the conversion unit 130 can clip the upper left corner of the image data only for interpretation. If no multi-dimensional code is found in the clipped upper left corner, the lower right corner, which is the next prioritized region, is interpreted. If no multi-dimensional code is found in this region again, the rest of the image data areas will be searched for a multi-dimensional code. Similarly, if the presence of a multi-dimensional code in a certain region can be recognized, a zoom-in function of photographing the region only can be performed. It is apparent that the function of extracting a multi-dimensional code from the above image data can be also performed in a separate code extraction unit (not illustrated).

The conversion unit 135 stores the operating programs and multi-dimensional code conversion rules of the order and payment terminal 120. The conversion unit 135 can further store one (hereinafter, "obtained information") of the image data, conversion information, and inputted supplementary code and the time information (e.g., YMD-HMS), in which the relevant data is saved. In case the conversion information corresponding to the image data is stored, the corresponding image data can be deleted for an efficient use of the storage space. The conversion information stored in the storage unit 135 can be the image data taken by the camera unit 125, or received from another user, and converted by the conversion unit 130 or the image data received from another user. As described above, the storage unit 135 can save the obtained information and time information in the form of a generated access information file. By saving the obtained information and time information (or save the access information file, hereinafter), a user can order a product or request information on a product, using the stored obtained information and time information, without having to make a buying decision even during a realtime broadcasting of the advertisement (e.g., commercial between programs, home shopping program, drama broadcasting, movie, etc.). However, certain information that allows the obtained information to designate the product may be needed to be saved together (which can be done through a memo function or such). If the order and payment terminal 120 is a DMB phone or other terminal that can receive broadcasting, the storage unit 135 can record the broadcast screen, and save the time information of the recording at the same time. Moreover, the storage unit 135 can further save additional information (e.g., terminal information data, payment information, hobby, gender, and personal information) depending on the type or need of the order and payment terminal 120. For example, the communication function information (e.g., device identifier number and phone number) can be further saved if the order and payment terminal is a mobile phone. As described above, as long as the stored data can identify the purchaser and function as the information to be used in the payment, the purchaser can make a payment for the purchase by transmitting the relevant information only, without signing up for the membership or providing the credit card number to the product management device 170. Therefore, this invention allows a consumer who has not signed up for a membership in a particular service to receive the relevant service, or order and make a payment when using a shopping mall.

The storage unit 135 can further save the access information template file corresponding to each advertising media, in order to facilitate the order or information request by the user. The access information template file can be an electronic file (e.g., a *.lit (Link Information Template) file) generated without the time information, and the file name can be display the relevant broadcaster and such. The access information template file can be pre-generated to correspond to major broadcasters and shopping malls and be supplied by the relevant broadcaster, shopping mall, or a template file provider, and the template files can be collected in a predesignated directory. For example, in case a user wants to purchase a product broadcast at 10:10 on the Hyundai Home Shopping channel, the user can select the template file corresponding to the Hyundai Home Shopping channel on the relevant directory and input an access data file generation command to have the relevant time information insert automatically and generate an access data file, in which case the name of the generated access data file can comprise at least one of the program title and product name corresponding to the relevant time. The program titles for the generation of the name of the access data file can be the information prestored in the storage unit 135 or be supplied from the product management device 170.

A request information generating unit 140 generates the request information comprising the obtained information (i.e., one of the image data and conversion information), by the control of the control unit 160, and the time information in which the obtained information is generated. The conversion information can comprise at least one of the media identifier, channel identifier, and serial number. The request information can be the order data or information request. The request information can be generated to correspond to the use identifier lattice included in a multi-dimensional code, or to correspond to the control command (e.g., order request or information request) inputted through the key input unit 145. The request information generating unit 140 can further comprise the location information (e.g., area code) corresponding to the current location of the order and payment terminal 120, to generate the request information. This is to prevent a wrong operation or wrong order in case the commercial is carried on local broadcasting only. For example, the area code can automatically reflect the current location of the order and payment terminal 120. Moreover, use of the area code can allow the same channel identifiers with different areas as different providers.

As described above, in case the access data file is saved in the storage unit 135, the request information generating unit 140 can use the access data file to generate the request information. However, since the information contained in the request information can be identical when various data are collected in an access data file or each of the data is individually stored, the description hereinafter will be focused on the case of generating the request information using the obtained information and time information. A key input unit 145 is means for commanding the photographing of a multi-dimensional code, searching and selecting the stored obtained information (i.e., image data and/or conversion data), commanding the generation of the request information, and inputting a supplementary code by the user. The key input unit 145 can take a form of, for example, a keypad comprising a plurality of key buttons or a touch screen. A purchaser can send the stored obtained information and time information to other recipients, using a variety of message transmission means (e.g., electronic file, short message, instant messenger, multimedia message, and e-mail), and the recipient can use the relevant information to order the product or request information, in which case sending the conversion information, rather than the image data of a photographed multi-dimensional code, can be more efficient in transmission, and sending the access data file can be most preferable considering the convenience of the user and manageability of the recipient. As such, with the present invention, a user can recommend a product the user wants to have or have purchased to a third person. It is also apparent that the function of recommending the ordering of a particular product or requesting information by transmitting the obtained information and the corresponding time information (or access data file) is not restricted by the communication function between the users, can be expanded to advertising messages sent to members and/or non-members of a advertising company (e.g., telecommunication company, broadcasting company, and contents provider). In this case, however, since the access data file generated to have personal payment information cannot be sent to other persons, the order and payment terminal 120 can further comprise a file correction function to remove the payment information in the relevant access data file. It is also apparent, of course, that the purchaser can generate an access data file containing payment information and give the file as a present, and the other recipient can use the purchaser's payment information to pay for the purchase but have the purchased merchandise to be sent to an address of the other recipient's choice. However, the purchaser can have the option data inserted in the access data file in order to minimize unforeseen damage by the access data file (please refer to 009 of Table 1). The option data can comprise time restriction for eligible use of the access data file and restriction on the number of orders using the access data file. If the purchaser wants to order a product corresponding to the obtained data, the purchaser can activate the memo function, using the key input unit 145, and input relevant information, such as the identity and features of the product.

The display unit 150 displays the order and payment screen and information screen corresponding to the data (e.g., web data and access URL) received through the communication unit 155 from the product management device 170 by the operation status and request information of the order and payment terminal 120. Moreover, the obtained information and relevant data stored in the storage unit 135 are displayed in a form similar to a call list, allowing the user to select.

The communication unit 155 converts the request information generated by the request information generating unit 140 to a predetermined format to be sent through a communication network, and transmits to the product management device 170. The communication unit also receives any one of the data from the product management device 170.

The control unit 160 controls the camera unit 125, conversion unit 130, storage unit 135, request information generating unit 140, key input unit 145, display unit 150, and communication unit 155 such that an order and payment terminal 120 based on this invention can perform aforementioned functions. The control unit 160 also controls the transmission route such that the request information can be transmitted to the product management device 170 through the communication unit 155. The control function of transmission route, conversion information generating function by the conversion unit 130, and request information generating function by the request information generating unit 140 can be performed by software programs that are designed to perform identical functions.

Although not illustrated in FIG. 1, the order and payment terminal 120 can further comprise conversion information interpreting unit (or connection information extraction unit). The conversion information interpreting unit interprets the conversion information inputted by the user by use of a mapping table (which can be stored in the storage unit, and can include the connection information to the destination) and processes to teach the kind of request (e.g., information, order). In case the data can be interpreted by the identifier code interpreting unit, the request to the destination is possible at the order and payment terminal 120 without requesting the data transmitted to the product management device 170. In other words, some or all of the functions, such as access address extraction to the information performed by the product management device 170, is performed at the order and payment terminal 120. Taking phone numbers for an example, this refers to emergency numbers (e.g., 114, 119, 123, 128), information numbers, hospital emergency rooms, traffic information, news media, financial institutions, insurance companies, and securities companies. If the relevant identifier code is already stored as a mapping table, the order and payment terminal 120 can interpret the destination and process without any help of the product management device 170. The order and payment terminal 120 can perform basic channel connection and reserved word services by including a conversion information interpreting unit. Another embodiment using the reserved word will be described separately.

The product management device 170 interprets the request information received from the order and payment terminal 120 through a communication network, and extract the corresponding web data or access URL (e.g., specific home page, link) to transmit to the order and payment terminal 120. For example, the product management device 170 can use the conversion information (e.g., channel identifier) and time information included in the request information to identify the product advertised on a certain channel at a certain time. For this, the product management device 170 can self-manage the programming information of each broadcasting channel or combine with a separate system that manages the information through a communication network. As such, by structuring a multi-dimensional code and time information to be linked and designate a specific product, each of the identical multi-dimensional codes can be used generally to designate different product. Of course, if there are a multiple number of products advertised at a certain time on a certain channel, the list of the products can be sent to the order and payment terminal such that the purchaser can make a selection. To this end, the product management device 170 can identify the product, and then determine whether the user is requesting an order or information to perform the appropriate operation. The access URL is a menu type, which can be for displaying a service screen including relevant menu items, such as order/payment, text message, e-mail, phone counseling with a service representative, and call-back. The purchaser can use the service screen to consult with a service representative and send inquiry to a service representative.

Moreover, the product management device 170 transmits a payment request, corresponding to a product whose order is requested from the order and payment terminal 120, to the order and payment terminal 120 and processes the payment using the payment information (e.g., credit card number, phone number, authorization information) received from the order and payment terminal 120. In other words, the product management device 170 can transmit a parameter request value, needed to provide a payment service upon the payment request, to the order and payment terminal 120. The parameter request value can be, for example, a mobile phone number or other value for requesting a variety of certifications.

The parameter request value can further comprise the request of information necessary for membership of the purchaser. The order and payment terminal 120 can either extracts and transmits a parameter value, corresponding to the parameter request value received from the product management device 170, from the personal information pre-stored in the storage unit 135 of the order and payment terminal 120 or transmits the data inputted by the purchaser through the key input unit 145.

If the request information received from the order and payment terminal 120 through a communication network contains not the conversion information but the image data, it is apparent that the product management device 170 can convert the image data to the conversion information and provide a corresponding service.

So far, through FIGS. 1-4, the system for ordering/making a payment for a product and requesting information using the advertisement displayed in various advertising media and the multi-dimensional code is described.

Another preferred embodiment of the present invention provides an order and payment terminal 120 capable of performing a correction function of time information in which the obtained information is stored.

In the cases of satellite broadcasting and Internet broadcasting, inconsistent transmission speed and network errors can cause the identical broadcasting data to display with an error of, for example, 1-3 seconds. In some cases, airwave broadcasting can have this error in time.

This can cause inconsistency between the time in programming information managed by the system and the time generated by the order and payment terminal 120. For example, suppose a commercial for electronic dictionary was aired, according to the programming data, between 9:10:05 and 9:10:35, and a user viewed the commercial between 9:10:08 and 9:10:38, due to an error in time. If the user captured a multi-dimensional code at 9:10:37, the product management device 170 would not be able to discern the product ordered by the request including the time information. In order to solve the above problem, an order and payment terminal 120 can set the time a little ahead of the real time when saving the obtained information. This is possible because few consumers will attempt to generate the obtained information as soon as the commercial begins, and many will generate the obtained information toward the end of the commercial. Moreover, if a lattice indicating the media identifier is included in a multi-dimensional code, the order and payment terminal 120 can have the time information to compensate as much as the time error of the advertising media corresponding to the media identifier when the obtained information is saved to correspond to any of the time information. The above correction of time information can be performed by the control unit 160.

Another preferred embodiment of the present invention provides an order and payment terminal 120 capable of transmitting the request information having the location information. As described above, identical broadcasting channels can have different commercials at the same time depending on the region. For example, the central program and local program can be different for a broadcasting signal whose channel is either different or identical per region.

In this case, including a location display lattice in the multi-dimensional code can indicate for which region the commercial is. Although the location display lattice is not included, the order and payment terminal 120 can include the location information (e.g., area code, latitudinal and longitudinal coordinates) recognized from GPS satellite signals and base station signals, and can send to the product management device 170.

Figure 5:
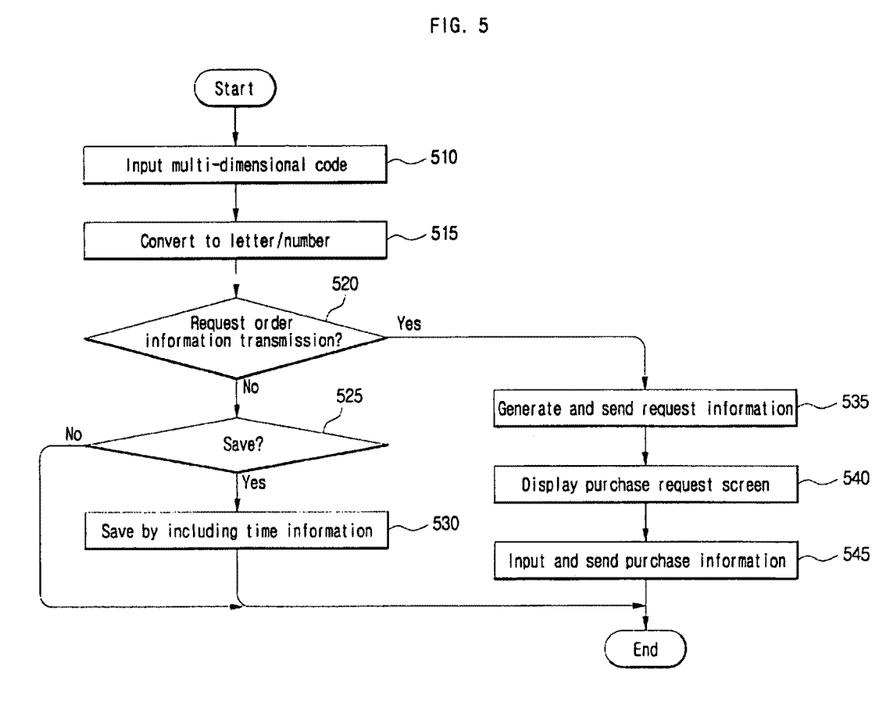
FIG. 5 shows a flowchart of a method for ordering a product and making a payment using a multi-dimensional code based on a preferred embodiment of the present invention.

FIG. 5 is a flowchart of a method for ordering a product and making a payment, using a multi-dimensional code based on a preferred embodiment of the present invention.

In describing, with reference to FIG. 5, a method for ordering and making a payment by use of a multi-dimensional code based on this invention, each step can be performed individually by each component of the order and payment terminal 120, but the description herein will treat that each step is performed by the order and payment terminal 120 to facilitate the description and understanding. Although a consumer can request information as well as order a product corresponding to a commercial recognized through an advertising media, using the order and payment terminal 120, that process is either similar or identical, and the description herein will just focus on the case of placing an order. Referring to FIG. 5, the order and payment terminal 120 receives a multi-dimensional code (step 510) displayed in an advertising medium, and converts (step 515) the received multi-dimensional code to the conversion information (i.e., letters, numbers, combinations thereof). The multi-dimensional code can be converted to the conversion information by the conversion unit 130 after being generated to the image data through the camera unit 125. Or, a supplementary code corresponding to the multi-dimensional code can be inputted through the key input unit 145.

In step 520, the order and payment terminal 120 determines whether there is a request for transmission of the order data corresponding to the obtained information (which is one of the image data, conversion information, and supplementary code, and the conversion information and supplementary code can be identical).

If transmission of the order data is not requested, the order and payment terminal 120 proceeds to step 525 to determine whether a command to save the obtained information is inputted. If the command to save the obtained information is inputted, step 530 is performed to save the obtained information in the storage unit 135 to have the obtained information correspond to the generated time information. When saving the obtained information in the storage unit 135, the time correction function, described above, can be performed as well. If the command for saving the obtained information is not inputted, the process stops. Of course, the process can repeat step 520 if the command for saving the obtained information is not inputted. If transmission of the order data is requested, however, the order and payment terminal 120 generates the request information in step 535 and transmits to the product management device 170 of an access address preset through a communication network.

Although FIG. 5 is illustrated as if saving the order data or requesting the transmission of the order data is an optional step, and the saving step is preceded, the order and payment terminal 120 can be preset to automatically save the time information (or the access data file) and conversion information corresponding to the transmitted request information in case the request information is transmitted in step 535 while the save command is not inputted in step 525. It is, of course, apparent that the automatic save function can be skipped by the user setting.

The request information transmitted in step 535 can comprise conversion information and time information, in which case an access data file can be used, as described earlier. At least one of the conversion information and time information can be converted to a pre-specified data format. In case ordering a product and making a payment are to be performed at the same time, the payment information (e.g., credit card number, phone number, authentication information, etc.) can be additionally included. If the advertisement is different per region, location information can be additionally included.

The order and payment terminal 120 displays, in step 540, the purchase request screen corresponding to the access URL or data received from the product management device 170 by the request information. As described above, step 540 can display the order confirmation screen if the payment information is included in the request information.

The order and payment terminal 120 receives, in step 545, payment information corresponding to the purchase request screen from the purchaser and transmits to the product management device 170 through a communication network. As described above, the purchase data input process of steps 540 and 545 can be skipped in case the product management device 170 transmits the parameter request value needed to provide a payment service, through a payment request, to the order and payment terminal 120, which then extracts a corresponding parameter value from the personal information prestored in the storage unit 135 and transmits.

So far, the process of how a purchaser can order/make a payment and request information for an advertisement displayed in advertising media has been described with reference to related drawings.

Another embodiment of the present invention provides, however, a payment method using an order and payment terminal 120 for tangible/intangible services provided by a bricks-and-mortar store.

For instance, a purchaser can set numbers like 2424 (for moving service), 4989 (for general merchandiser), 5151 (for gas station), and 7575 (for billing service) as reserved words for specific services in the order and payment terminal 120 for use of the pertinent service. That is, when the purchaser inputs the reserved word and transmits to a predetermined payment system with the current time information, payment for a service or product can be facilitated.

For example, if a purchaser pumps gas in a gas station and requests transmission by inputting the reserved word (5151) and payment request amount, the order and payment terminal 120 reads the current location information and transmits together to a corresponding payment system, in which case the purchaser could have prestored the vehicle number in the order and payment terminal 120 for use during the payment. The location information of the order and payment terminal 120 can be the gas station code inputted by the purchaser. The payment system recognizes the gas station corresponding to the received current location information and process to have the payment request amount paid from the pertinent purchaser. To this end, the purchaser docs not need to carry a credit card to pay for the payment request amount, and can prevent the pertinent credit card from being illegally copied at the gas station. Moreover, the gas station can perform the customer fulfillment, such as mileage, coupon, and event, online regardless of the type of payment (e.g., wired transaction, debit card payment, and credit card payment).

As described above, the purchaser can preset a reserved word to link to a specific access data file, that is, the purchaser can prestore the data (e.g., vehicle number, and payment information, for a reserved word that payment is required) corresponding to a reserved word. However, the access data file will not include time information, because the time information is used only when the purchaser inputs the reserved word and request transmission. For example, if a purchaser stored the vehicle number to correspond to the reserved word 5151 in the storage unit 135 of the order and payment terminal 120, inputting 5151 and requesting transmission after pumping gas at a gas station facilitate the order and payment terminal 120 to transmit the stored vehicle number and current time information to a payment system. Likewise, the gas station sends the price of the pumped gas and the vehicle number to the same payment system, and the payment system checks on the vehicle information and sends the detected gas price information to the order and payment terminal 120, while the purchaser can confirm the gas price information displayed on the display unit 150 and request the payment to have the payment information sent to the payment system. Of course, it is apparent that the purchaser can set the payment information stored to correspond to a reserved word to be transmitted together when the reserved word is inputted, to complete the payment without an additional step. Likewise, the purchaser can receive a location-based service (e.g., restaurant search, local locksmith, etc.) corresponding to the current location by setting reserved words such as 1662 (restaurant) and 1313 (locksmith).

Of course, as described earlier with reference to the related drawings, the same effect can be achieved using a multi-dimensional code although the above reserved words are used. For example, if a gas station clerk presents a multi-dimensional code indicating the pertinent charge to a purchaser who pumped a certain amount of gas, or the pertinent multi-dimensional code is displayed on a display device located near the gas pump, the purchaser can photograph the multi-dimensional code, using the order and payment terminal 120, and transmit the payment request information. This is either very similar or identical to multi-dimensional codes displayed in advertising media in the structure or process method, except for some of the use, thus those who are skilled in the art should be able to understand without a separate description, which will be hence omitted.

The accompanying drawings and detailed description are only an example of the present invention, serve only for describing the present invention, and by no means limit or restrict the spirit and scope of the present invention. Thus, any person of ordinary skill in the art shall understand that a large number of permutations and other embodiments are possible. The true scope of the present invention must be defined only by the spirit of the appended claims.

INDUSTRIAL APPLICABILITY

As described above, a method and apparatus for requesting service using a multi-dimensional code based on the present invention displays the multi-dimensional code together with the data corresponding to information delivery media (e.g., television, newspaper, magazine, business card, and bill) to allow a user to access to detailed information corresponding to the pertinent information, using the multi-dimensional code.

The present invention allows a user to conveniently order a product, using a communication terminal, by displaying a product and a multi-dimensional code for ordering the product together on the advertising media.

The present invention also links the product advertising screen with detailed information on the pertinent product, allowing a user to access to the detailed information without a separate input process by the user.

The present invention also facilitates the payment for a purchased product through the use of a communication terminal.

This invention discourages impulse buying and encourages a careful buying decision by allowing non-realtime ordering of a product using an access data file corresponding to the image data and/or conversion information of an advertising screen stored in a communication terminal. If a user saves an advertising screen of a product in a communication terminal, although the advertisement was provided realtime, for example on a TV home shopping channel, the user can order the product using the image data, the conversion information converted from the image data or a stored access data file corresponding to one of these data.

The present invention also allows payment for a product or service (e.g., gas, food, etc.) even at an off-line store (e.g., gas station, restaurant, etc.), using a user's communication terminal capable of making a payment through a reserved word or recognizing a multi-dimensional code presented by the store.

The present invention also allows a first user, who generated an advertising screen as image data, to transmit the image data, conversion information converted from the image data or a stored access data file corresponding to one of these data to a second user through a communication network such that the second user can purchase a product corresponding to the image data. Here, transmitting the conversion information or access data file can improve the transmission efficiency than transmitting the image data.

The present invention also allows accurate ordering of a product by automatically correcting an error occurred between the time the data is received and the time the data is displayed in the satellite broadcasting or in the same broadcasting medium.

What is claimed is:

1. A method for requesting a service corresponding to at least one of displays of information and advertisement displayed in information delivery media, using a user terminal, comprising:

(a) generating, by a camera unit, image data from a multi-dimensional code displayed on the information delivery media;

(b) generating, by a conversion unit, conversion data by converting said image data based on one or more of predetermined rules;

(c) generating, by a request data generating unit, request data by integrating time data with said conversion data, wherein said time data includes at least one or more of time information of photographing the multi-dimensional code, time information of generating said conversion data, time information of generating said request data, and time information of receiving user input and wherein said request data include one or both of order request and detailed information request;

(d) transmitting, by a communication unit, said request data to an information device via a communication network;

(e) displaying, by a display unit, response data received from said information device, herein said response data is determined by integrating said time data with one or both of said image data and said conversion data wherein said multi-dimensional code is displayed as lattices of m (natural number)×n (natural number), to each of which an attribute is applied, and said conversion data is interpreted from the attribute of each lattice according to a predetermined rule.

2. The method of claim 1, wherein said step (b) comprising:
extracting a multi-dimensional code image, using at least one of outline extraction technique, skip scan technique, multi scan technique, and area priority information in said image data; and
converting said extracted multi-dimensional code image to said conversion information, using said predetermined rule.

3. The method of claim 1, further comprising:
storing one or more of said image data, one or more of said conversion data, one or more of said time data or combination of said image data, said conversion data, and said time data; and
receiving commands from a user for selecting said image data and said conversion data, and said time data for generating and transmitting said request data.

4. The method of claim 1, wherein said request data is generated to additionally include one or more of location information, personal information, payment information, identification information of said user terminal, hobby information, gender information, e-mail address, and designated service number information.

5. The method of claim 1, wherein said time data is compensated by a predetermined error value for increasing the accuracy in determining the correct response data which corresponds to said request data.

6. The method of claim 1, further comprising:
receiving a payment information request corresponding to said request data from said information device; and
transmitting payment information corresponding to said payment information request to said information device through a communication network.

7. The method of claim 1, wherein said multi-dimensional code has a concentric circular structure, in which a plurality of circles with different radii are formed in bands; each circle is partitioned to n (natural number) regions, to each of which an attribute is applied; and said conversion data is interpreted from the attribute of each region according to a predetermined rule in the clockwise or counterclockwise direction from the center to the outside.

8. The method of claim 7, wherein said attribute is one or more of color, design, pattern, and letter.

9. The method of claim 1, wherein said attribute is one or more of color, design, pattern, and letter.

10. The method of claim 1, wherein said multi-dimensional code comprises information corresponding to one or more of media identifier, channel identifier, serial number information, location information, language identifier information, and level identifier information.

11. The method of claim 1 further comprising:
pre-storing at least one unique conversion data and at least one default attribute corresponding to said unique conversion data;
determining whether conversion data of said step (b) is identical to said unique conversion data; and
performing said step (c) when conversion data of said step (b) is not identical to said unique conversion data; and
performing said step (c) using said default attribute and said conversion data when conversion data of said step (b) is identical to said unique conversion data.

12. A user terminal for requesting a service corresponding to at least one of displays of information and advertisement displayed in information delivery media, comprising:
a camera unit for generating image data by photographing a multi-dimensional code;
a conversion unit for converting said image data to conversion data based on one or more of predetermined rules;
a request data generating unit for generating request data, by integrating time data with said conversion data, wherein said time data includes at least one or more of time information of photographing the multi-dimensional code, time information of generating said conversion data, time information of generating said request data, and time information of receiving user input, and wherein said request data include one or both of order request and detailed information request;
a communication unit for transmitting said request data to an information device via a communication network and receiving response data from said information device, wherein said response data is determined using one or both of said image data and said conversion data in conjunction with said time data; and
a display unit for displaying response data received from said information device,
wherein said response data is determined by integrating said time data with one or both of said image data and said conversion data,
wherein said multi-dimensional code is displayed as lattices of m (natural number)×n (natural number), to each of which an attribute is applied, and said conversion data is interpreted from the attribute of each lattice according to a predetermined rule.

13. The user terminal of claim 12, wherein said conversion unit is characterized by extracting a multi-dimensional code image, using at least one of outline extraction technique, skip scan technique, multi scan technique, and area priority information in said image data; and converting said extracted multi-dimensional code image to said conversion data, using said predetermined rule.

14. The user terminal of claim 12, wherein said multidimensional code has a concentric circular structure, in which a plurality of circles with different radii are formed in bands; each circle is partitioned to n (natural number) regions, to each of which an attribute is applied; and said conversion data is interpreted from the attribute of each region according to a predetermined rule in the clockwise or counterclockwise direction from the center to the outside.

15. The user terminal of claim 14, wherein said attribute is one or more of color, design, pattern, and letter.

16. The user terminal of claim 12, wherein said attribute is one or more of color, design, pattern, and letter.

17. The user terminal of claim 12, further comprising:
a storage unit for storing said image data, said conversion data, said time data and one or more of supplementary data, wherein said supplementary data include location information, personal information, authentication information, payment information, identification information of said user terminal, hobby information, gender information, e-mail address, and designated service number information; and an input unit for receiving commands for selecting said image data, said conversion data, said supplementary data and said time data for generating and transmitting said request data.

18. The user terminal of claim 17, wherein, once a selection commands and recipient of said image data or said conversion data are inputted through said key input unit, said communication unit transmits said image data or said conversion data and said time data to said recipient.

19. The user terminal of claim 12, further comprising an error compensation unit generating said time data compensated by a predetermined error value for increasing the accuracy in determining the correct response data which corresponds to said request data.

20. The user terminal of claim 12, further comprising a location information generating unit generating location information of said user terminal, wherein said request data generating unit generates said request data by integrating said location information.

21. The user terminal of claim 12, further comprising:
   a storage unit for storing payment information comprising one or more of credit card information, phone number, and authentication information; and
   an extraction unit for extracting said payment information;
   wherein, in case said communication unit receives a payment information request corresponding to said order request from said information device, said communication unit transmits said payment information extracted by said extraction unit to said information device.

22. The user terminal of claim 12, wherein said multi-dimensional code comprises information corresponding to one or more of media identifier, channel identifier, serial number information, location information, language identifier information, and level identifier information.

23. The user terminal of claim 12, further comprising:
   a storage unit for pre-storing at least one unique conversion data and at least one default attribute corresponding to said unique conversion data; and
   a comparison unit for determining whether said conversion data is identical to said unique conversion data.

24. A non-transitory recorded medium, structured with a program of commands executable by a digital processing device to perform a method for requesting a service corresponding to a display in information delivery media, and readable by said digital processing device, the recorded medium comprising the acts of:
   Generating, by a camera unit, image data from a multi-dimensional code displayed to correspond to said display corresponding to one or more of information and advertisement displayed in information delivery media;
   converting, by a conversion unit, said image data to conversion data based on a predetermined rule;
   generating, by a request data generating unit, request data by integrating time data with said conversion data, wherein said time data includes at least one or more of time information of photographing the multi-dimensional code, time information of generating said conversion data, time information of generating said request data, and time information of receiving user input. and wherein said request data include one or both of order request and detailed information request:
   transmitting, by a communication unit, said request data to an information device via a communication network; and
   displaying, by a display unit, response data received from said information device, wherein said response data is determined by integrating said time data with one or both of said image data and said conversion data,
   wherein said multi-dimensional code is displayed as lattices of m (natural number)×n (natural number), to each of which an attribute is applied, and said conversion data is interpreted from the attribute of each lattice according to a predetermined rule.

25. A method for requesting a service corresponding to at least one of displays of information and advertisement displayed in information delivery media, using a user terminal, comprising:
   (a) generating, by a camera unit, image data from a multi-dimensional code displayed on the information delivery media, wherein said multi-dimensional code is displayed as lattices of m (natural number)×n (natural number) or displayed as a concentric circular structure having a plurality of circles with different radii formed in bands that are partitioned to n (natural number) regions, wherein said lattices and said partitioned regions of circles are assigned with at least one or more of attributes, and wherein said attributes include one or more of color, design, pattern, number, and letter;
   (b) generating, by a conversion unit, conversion data by converting said image data, wherein said conversion data is interpreted from the attribute of each lattice based on one or more of predetermined rules;
   (c) generating, by a request data generating unit, request data by integrating time data with said conversion data, wherein said time data includes at least one or more of time information of photographing the multi-dimensional code, time information of generating said conversion data, time information of generating said request data, and time information of receiving user input, and wherein said request data include one or both of order request and detailed information request;
   (d) transmitting, by a communication unit, said request data to an information device via a communication network; and
   (e) displaying, by a display unit, response data received from said information device, wherein said response data is determined by integrating said time data with one or both of said image data and said conversion data.

26. A user terminal for requesting a service corresponding to at least one of displays of information and advertisement displayed in information delivery media, comprising:
   a camera unit for generating image data by photographing a multi-dimensional code displayed in said information delivery media, wherein said multi-dimensional code is displayed as lattices of m (natural number)×n (natural number) or displayed as a concentric circular structure having a plurality of circles with different radii formed in bands that are partitioned to n (natural number) regions, wherein each of said lattices and each of said partitioned regions of circles are assigned with at least one or more of attributes, and wherein said attributes include one or more of color, design, pattern, number, and letter;
   a conversion unit for converting said image data to conversion data based on one or more of predetermined rules;
   a request data generating unit for generating request data by integrating time data with said conversion data, wherein said time data includes at least one or more of time information of photographing the multi-dimensional code, time information of generating said conversion data, time information of generating said request data, and time information of receiving user input, and wherein said request data include one or both of order request and detailed information request; and a communication unit for transmitting said request data to an information device via a communication network and receiving response data from said information device, wherein said response data is determined using one or both of said image data and said conversion data in conjunction with said time data.

27. A method for requesting a service corresponding to at least one of displays of information and advertisement displayed in information delivery media, using a user terminal, comprising:
  (a) pre-storing, by a storage unit, at least one unique conversion data and at least one default attribute corresponding to said unique conversion data;
  (b) generating, by a camera unit, image data from a multi-dimensional code displayed on the information delivery media;
  (c) generating, by a conversion unit, conversion data by converting said image data based on one or more of predetermined rules;
  (d) determining, by a control unit, whether conversion data of said step (c) is identical to said unique conversion data;
  (e) generating, by a request data generating unit, request data by integrating time data with said conversion data, when conversion data of said step (c) is not identical to said unique conversion data, wherein said time data includes at least one of time information of photographing the multi-dimensional code, time information of generating said image data, and time information of generating said conversion data, and wherein said request data include one or both of order request and detailed information request;
  (f) generating, by the request data generating unit, request data using said default attribute and conversion data when conversion data of said step (c) is identical to said unique conversion data, wherein said time data includes at least one or more of time information of photographing the multi-dimensional code, time information of generating said conversion data, time information of generating said request data, and time information of receiving user input, and wherein said request data include one or both of order request and detailed information request;
  (g) transmitting, by a communication unit, said request data to an information device via a communication network; and
  (h) displaying, by a display unit, response data received from said information device, wherein said response data is determined by integrating said time data with one or both of said image data and said conversion data, wherein said multi-dimensional code is displayed as lattices of m (natural number)×n (natural number), to each of which an attribute is applied, and said conversion data is interpreted from the attribute of each lattice according to a predetermined rule.

* * * * *